The specifications of this patent
7470X
S. Deming,
Wind Wheel,
Patented Mar. 8, 1833.
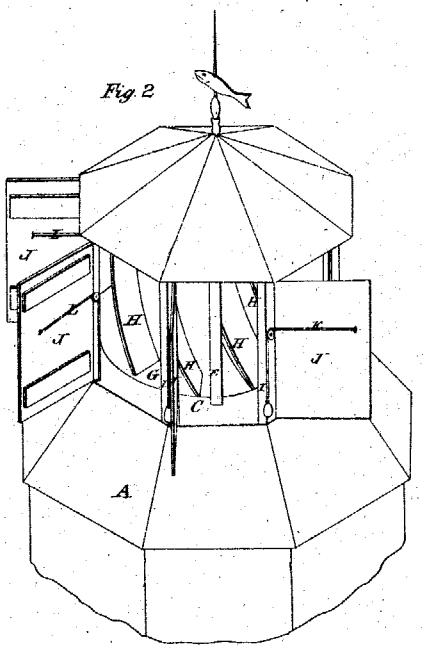
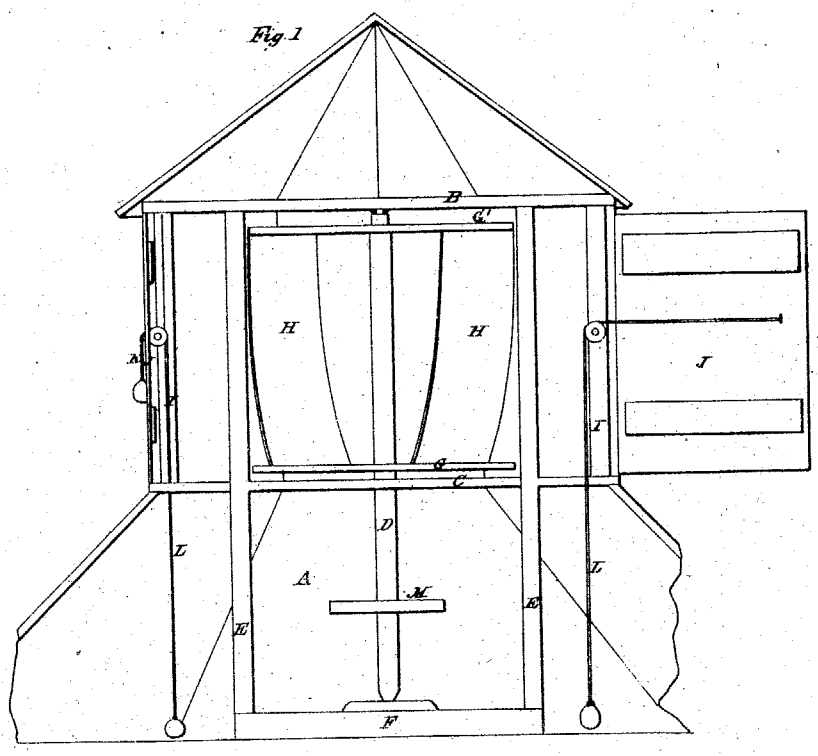

Solomon Deming of Brunswick. Ohio
Letters Patent.

The schedule referred to in these Letters Patent and making part
of the same, containing a description in the words of the said Solomon
Deming himself of his improvement being a wind wheel or mill,
turning in a horizontal direction Be it known that I Solomon Deming of Brunswick in the
County of Medina, and State of Ohio, have made an improvement
in the useful arts, being a wind wheel or mill turning in a hori-
-zontal plane and which is described as follows, This wind wheel consists of a vertical shaft, with the wings or
fans to receive the wind to turn the shaft. The upper and lower
floors and posts or uprights forming a frame to support the
works; the shutters pulleys &c. for admitting the wind upon the wings The vertical shaft is made of any suitable size for the mill
intended to be built. it is placed vertically in the centre of the
building. turning on gudgeons in steps or boxes. On the top of the
shaft, and also at the proper distance below are framed into
the shaft twelve arms more or less to receive the wings or
fans. Or two circular platforms may be constructed of thick
plank to answer the same purpose. The shaft receives its
[illegible] from four posts passing throughthe centre of the mill
framed together at the bottom by two strong beams, or cross pieces
and fastened by keys or bolts on the upper platform or floor.
The upper gudgeon of the shaft, turns in a box placed in a cross
piece in the upper platfrom, and the lower gudgeon turns on a box
or step on the cross piece below, There are about twelve wings or fans more or less, placed round
the shaft at equal distances apart, at an angle of about 44 degrees Deming

7470X with the shaft; they receive their support from the arms or circular platform attached to the vertical shaft before described. The shaft is turned by the wind striking upon these wings in a horizontal direction sufficient room being left for them to turn within the frame.

There are eight outward posts more or less placed at equal distances apart on a lower floor made of strong plank, and divided into as many sides as there are posts. they are supported at the top by an upper floor made of the same size, strength and figure as the lower floor, Openings are made in these floors for the vertical shaft and the four posts, before mentioned, to pass; and also the cords with the weights to be hereafter described.—

There are eight shutters more or less turning on pivots, in the upper and lower floors and resting, when closed against steps or beams near the shaft these shutters are to be opened and closed for letting the wind on or off the wings or fans—

To the back of each shutter is fastened a rope or cord which passes over a pulley in the post adjoining, for opening the shutter; a weight is attached to the end of the rope for keeping the shutters open and hangs on the outside of the post. Another rope is fastened in the inside of the shutters and passes over a pulley in the post near the shaft, and through the lower floor, having a weight also attached to the end of it and is for closing the shutters to prevent the admission of wind when too strong, On the vertical shaft is a cog wheel which gears into any other wheel required for giving motion to mills or machinery Operation the shutters being opened on all sides the wind strikes the wings or fans attached to the shaft and causes it to turn in a horizontal direction and gives motion to the cog wheel with the machinery attached— The invention here claimed and desired to be secured by Letters Patent, is the before described wind wheel particularly the wings or fans attached to the arms or heads, the shutters for letting on and off the wind, and ~~the~~ ropes, weights, and pulleys by which they are opened and shut.— For a farther illustration of my inventi 7470X 324

I refer to the model and drawing of the same deposited in the Patent Office. — In testimony whereof, I have subscribed my name this 28th day of February. 1833.

Solomon Deming

Witnesses

Samuel S Hayslip

B. N. Frase

R. B. Grat

Exa

W.G.C.

792 to 793